Patented Feb. 22, 1944

2,342,101

UNITED STATES PATENT OFFICE 2,342,101

PREPARATION OF DIHYDRO MUCONONI-TRILE AND PRODUCT

Oliver W. Cass, Niagara Falls, and Arthur O. Rogers, Lewiston, N. Y., assignors to E. I. du Pont de Nemours & Company, Wilmington, Del., a corporation of Delaware No Drawing. Application May 25, 1942, Serial No. 444,434

10 Claims. (Cl. 260—464)

This invention relates to organic nitriles, particularly beta-hydromucononitrile, and their preparation.

It is an object of this invention to provide a method of obtaining valuable organic nitriles, particularly the new compound beta-hydromucononitrile. Other objects will be apparent from the ensuing description of the invention.

The above objects may be accomplished in accordance with the invention by reacting 1,4-dibromobutene-2 or 1,4-dichlorobutene-2 with an alkali metal or alkaline earth metal cyanide. The reaction may be carried out, for example, in an alcoholic medium. Advantageously, the reaction medium is one which, in addition to being inert, or substantially so, towards the reactants or the desired reaction products, is a solvent for the reactants. The liquid medium may be one that completely dissolves the reactants; however, an inert liquid which under the conditions of use dissolves substantial amounts of the reactants without effecting complete solution, may also be used. Suitable solvents are ether alcohols such as the monomethyl ether or ethylene glycol and the lower aliphatic alcohols such as methanol, ethanol, and propanol. Such an alcohol which contains from about 5 to 30% of water is the preferred reaction medium.

Temperatures somewhat above room temperatures are generally required for carrying out the process. Best results are obtained at about the atmospheric reflux temperature of the reaction medium although temperatures higher or lower may be used. Temperatures in the range of 50° to 150° C. are preferable. When it is desired to use temperatures above the atmospheric reflux temperature of the reaction mixture, it will, of course, be necessary to operate under superatmospheric pressure, e. g., in a closed reaction space. The temperature, of course, should not be so high as to cause side reactions or decomposition reactions which involve either the reactants or the reaction products to occur at excessive rates. While temperatures below atmospheric reflux temperatures may be used, extremely low temperatures are not effective since at such temperatures the reaction does not occur at an appreciable rate. The temperature should be high enough to cause the reaction to proceed but not so high that side reactions and decomposition reactions become excessive.

The reaction to produce the nitriles and particularly beta-hydromucononitrile may be effected by bringing the metal cyanide into contact with the dihalide in the presence of a suitable solvent under suitable temperature conditions. The most preferred method for carrying out the reaction involves reacting the dihalide with an alkali metal cyanide which is formed in the reaction mixture as required by the reaction. The dihalide, together with hydrocyanic acid, may be dissolved in an alcohol. A water solution of sodium hydroxide is then added at such a rate that the sodium cyanide, resulting from a reaction between the sodium hydroxide and hydrocyanic acid, is used up as it is formed by reaction with the dihalide. It is not necessary that the sodium hydroxide solution be added to the mixture of the dihalide and hydrocyanic acid since the hydrocyanic acid and sodium hydroxide may be added simultaneously at appropriate rates to a reaction mixture containing the dihalide. Alternatively, all three of the reactants, i. e., sodium hydroxide, hydrocyanic acid, and the dihalide, may be added simultaneously at suitable rates to a reaction medium maintained at an appropriate temperature. Forming the metal cyanide in the reaction mixture as required by the reaction between the cyanide and the dihalide, gives distinctly improved results, particularly insofar as the formation of beta-hydromucononitrile is concerned. Under such conditions substantially improved yields of beta-hydromucononitrile result.

Suitable metal cyanides are the alkaline earth (including magnesium) and alkali metal cyanides, and mixtures of such cyanides. However, the alkali metal cyanides, particularly sodium cyanide, are preferred. Catalysts, e. g., cuprous cyanide, occasionally employed in reactions of this type may also be used although the reaction proceeds readily in the absence of any catalyst. The reaction mixture is best maintained in a state of agitation during the reaction period. Either the dibromo- or dichlorobutene, or mixtures thereof, may be used successfully. Use of the dichloride is preferred because it may be more cheaply prepared by known methods.

The reactants are preferably employed in amounts corresponding to 2 moles of an alkali metal cyanide for each mole of dibromo- or dichlorobutene. However, either reagent may be used in excess. A large excess of one reactant or the other will generally prove wasteful and, so far as is apparent, has no particular advantage.

Beta-hydromucononitrile is a new compound having the formula: $CN-CH_2CH=CHCH_2-CN$. When crystallized from methanol it melts at a temperature of 74-76° C. The compound is insoluble in cold water, difficultly soluble in hot water but soluble in methanol and methylene chloride. It is hydrolyzed by boiling with concentrated hydrochloric acid to give beta-hydromuconic acid. In addition to beta-hydromucononitrile, the process also results in the formation of substantial amounts of alpha-cyanoprene. Various by-products, such as halocyanobutenes, dialkoxy butenes and resinous products, are generally also produced.

The following examples are illustrative of the invention.

*Example 1*

A one-liter, three-necked reaction flask was fitted with a thermometer, a reflux condenser and a mercury-sealed stirrer. There were added to the reaction flask 0.824 mole of 1,4-dichlorobutene-2, 1.235 moles of sodium cyanide and 412 cc. of 75% ethyl alcohol. The mixture was agitated and heated at 70° C. for 5 hours after which it was cooled, filtered to remove sodium chloride and distilled at atmospheric pressure to remove the alcohol. The residue separated into an organic layer and an aqueous layer. The latter was extracted three times with 50 cc. portions of methylene chloride, and the extract combined with the organic layer and then dried over anhydrous potassium carbonate. Upon distillation of the dried material there was obtained a 13.1% yield of alpha-cyanoprene and a fraction boiling around 110° C. at 2 millimeters pressure which crystallized out in the still column. The white solid, after recrystallizing from methanol, melted at 74-76° C., was insoluble in cold water, difficultly soluble in hot water, but soluble in methanol and methylene chloride. The nitrogen content of the crystalline material was 27% (Kjeldahl method) as compared with a theoretical value of 26.42% for beta-hydromucononitrile.

*Example 2*

The method of Example 1 was repeated using 1 mole of the dichlorobutene, 2.2 moles of sodium cyanide and 500 cc. of 75% ethanol. Aside from alpha-cyanoprene, and chlorocyanobutene, there was recovered upon working up the reaction mixture, 19.3 grams of a material boiling in the same range as the beta-hydromucononitrile obtained in Example 1. This material was obtained as a reddish brown liquid, apparently a mixture of cis and trans isomers of beta-hydromucononitrile.

*Example 3*

A mixture of 2 moles of 1,4-dibromobutene-2, 4 moles of hydrocyanic acid, and 400 cc. of methanol was placed in a reaction flask provided with a thermometer, an agitator, a dropping funnel and a reflux condenser. While the mixture in the flask was being agitated and heated under reflux conditions, there was added over a period of about one-half hour 4 moles of sodium hydroxide dissolved in 140 cc. of water. There was recovered from the reaction mixture in substantially the manner described in Example 1, cyanoprene in a yield of 40.5% and dimethoxybutene-2 in a yield of 3.3%. In addition there was obtained a 20.4% yield of crude beta-hydromucononitrile which, upon standing, yielded a mixture consisting of 12.5 grams of crystalline product and 30.74 grams of liquid product. The two products apparently were cis and trans isomers of beta-hydromucononitrile. The crystalline material was hydrolyzed to beta-hydromuconic acid by refluxing with concentrated aqueous hydrochloric acid. The resulting acid melted at 194-195° C. as compared with a reported value of 195° C. Its neutralization equivalent was 71 as compared with a theoretical value of 72.

Results similar to those reported in Example 3 were obtained in an experiment in which the sodium hydroxide was added to the reaction mixture as a solution in methanol instead of water.

The nitriles, including beta-hydromucononitrile, which are formed as products in the present process are useful for many purposes, for example, as intermediates in the preparation of various organic compounds.

The foregoing examples and specific embodiments of the invention are illustrative and it is not intended that the invention be limited thereby except as indicated in the appended claims.

We claim:

1. The method of preparing beta-hydromucononitrile comprising reacting a compound of the group consisting of 1,4-dibromobutene-2 and 1,4-dichlorobutene-2 with a metal cyanide of the group consisting of the alkali and alkaline earth metal cyanides.

2. The method comprising reacting a compound of the group consisting of 1,4-dibromobutene-2 and 1,4-dichlorobutene-2 with a metal cyanide of the group consisting of the alkali and alkaline earth metal cyanides in an inert solvent and recovering beta-hydromucononitrile from the reaction mixture.

3. The method comprising reacting a compound of the group consisting of 1,4-dibromobutene-2 and 1,4-dichlorobutene-2 with an alkali metal cyanide in an aqueous-alcoholic reaction medium at substantially the atmospheric reflux temperature of the reaction mixture and recovering beta-hydromucononitrile from the reaction mixture.

4. A method of preparing beta-hydromucononitrile comprising reacting a compound of the group consisting of 1,4-dibromobutene-2 and 1,4-dichlorobutene-2 with an alkali metal cyanide in an inert solvent, said cyanide being formed in the reaction mixture as required.

5. A method of preparing beta-hydromucononitrile comprising reacting a compound of the group consisting of 1,4-dibromobutene-2 and 1,4-dichlorobutene-2 with sodium cyanide in an inert solvent, said sodium cyanide being produced in the reaction mixture as required, by reacting sodium hydroxide with hydrocyanic acid in said mixture.

6. A method of preparing beta-hydromucononitrile comprising reacting sodium hydroxide with hydrocyanic acid in an inert solvent medium containing a compound of the group consisting of 1,4-dibromobutene-2 and 1,4-dichlorobutene-2, and controlling the reaction between said sodium hydroxide and said hydrocyanic acid so as to produce sodium cyanide in the reaction mixture at about the same rate as said sodium cyanide is consumed by reaction with said dihalobutene.

7. A method of preparing beta-hydromucononitrile comprising adding an aqueous solution of sodium hydroxide to a solution of hydrocyanic acid and a dihalobutene in methanol, said dihalobutene being selected from the group consisting of 1,4-dibromobutene-2 and 1,4-dichlorobutene-2, while maintaining said reaction mixture at substantially its reflux temperature and recovering beta-hydromucononitrile from the resulting mixture.

8. In a process for preparing beta-hydromucononitrile by reacting an alkali metal cyanide with a compound of the group consisting of 1,4-dibromobutene-2 and 1,4-dichlorobutene-2, the step comprising forming said alkali metal cyanide in the reaction medium during the course of the reaction between said alkali metal cyanide and said compound.

9. Beta-hydromucononitrile.

10. The dinitrile melting at 74–76° C. and having the formula: $CN-CH_2CH=CHCH_2-CN$.

OLIVER W. CASS.
ARTHUR O. ROGERS.